(12) United States Patent
Toya et al.

(10) Patent No.: US 8,199,087 B2
(45) Date of Patent: Jun. 12, 2012

(54) LIQUID CRYSTAL DISPLAY DEVICE

(75) Inventors: Takashi Toya, Gifu (JP); Yutaka Kobashi, Mizuho (JP)

(73) Assignee: Epson Imaging Devices Corporation, Nagano (JP)

( * ) Notice: Subject to any disclaimer, the term of this patent is extended or adjusted under 35 U.S.C. 154(b) by 669 days.

(21) Appl. No.: 12/361,902

(22) Filed: Jan. 29, 2009

(65) Prior Publication Data

US 2009/0231504 A1 Sep. 17, 2009

(30) Foreign Application Priority Data

Mar. 14, 2008 (JP) ................................ 2008-065350

(51) Int. Cl.
*G09G 3/36* (2006.01)
(52) U.S. Cl. ............................... 345/87; 345/38; 349/39
(58) Field of Classification Search .................... 349/39; 345/38, 87, 90, 93
See application file for complete search history.

(56) References Cited

U.S. PATENT DOCUMENTS

2006/0145978 A1* 7/2006 Takatori et al. ................. 345/87
2007/0109239 A1* 5/2007 den Boer et al. ............... 345/87

FOREIGN PATENT DOCUMENTS

JP A-2002-258799 9/2002

* cited by examiner

*Primary Examiner* — Adam R Giesy
(74) *Attorney, Agent, or Firm* — Oliff & Berridge, PLC

(57) ABSTRACT

A liquid crystal display device includes a scanning line and a signal line that are disposed to intersect each other, a pixel that is disposed in correspondence with an intersection of the scanning line and the signal line and includes a liquid crystal and a pixel electrode, a common electrode, and a storage capacitor that apply a voltage to the liquid crystal, a storage capacitor line that is used for forming the storage capacitor, and a plurality of storage capacitor line driving circuits that is used for driving the storage capacitor line. The plurality of storage capacitor line driving circuits is disposed in one end and the other end of the storage capacitor line, and the electric potential of the storage capacitor line is configured to be fixed to a designated electric potential based on a reset signal that is input to the plurality of storage capacitor line driving circuits.

6 Claims, 9 Drawing Sheets

LIQUID CRYSTAL DISPLAY DEVICE

BACKGROUND

1. Technical Field

The present invention relates to a liquid crystal display device, and more particularly, to a liquid crystal display device that has a storage capacitor.

2. Related Art

Generally, liquid crystal display devices including a storage capacitor have been known (for example, see JP-A-2002-258799). In, JP-A-2002-258799, a liquid crystal display device including a storage capacitor line that is used for forming a storage capacitor between a pixel electrode and the storage capacitor line, and a storage capacitor line driving circuit (common-electrode line driving circuit) that drives a storage capacitor line (common-electrode line) has been disclosed. This liquid crystal display device is driven by using a storage capacitor line inverting drive method in which a voltage applied to the storage capacitor line by the storage capacitor line driving circuit changes to have a fixed amplitude.

However, according to the liquid crystal display device disclosed in JP-A-2002-258799, when the liquid crystal display device is configured in a large size of, for example, four inches or more, the resistance value and the parasitic capacitance of the storage capacitor line increase. Thus, it is known that a phenomenon in which a signal delay time or a relaxation time of distortion occurring in a signal line is not within a regulation time occurs. Thus, driving of a storage capacitor line by using a plurality of the storage capacitor line driving circuits has been devised. In such a case, it is possible to decrease the resistance value and the parasitic capacitance of the storage capacitor line. However, there is a case where the electric potentials of the plurality of the storage capacitor line driving circuits are different from one another in the initial state before the power is input. In such a case, when signals rise in the storage capacitor line driving circuits, different voltages may be applied to the storage capacitor line from the plurality of the storage capacitor line driving circuits. In such a case, there is a problem that a leak current (a current referred to as a leak current or a pass-through current) flows from one storage capacitor line driving circuit to another storage capacitor line driving circuit through the storage capacitor line.

SUMMARY

An advantage of some aspects of the invention is that it provides a liquid crystal display device capable of suppressing a leak current to flow through the storage capacitor line among the plurality of the storage capacitor line driving circuits.

According to a first aspect of the invention, there is provided a liquid crystal display device including: a scanning line and a signal line that are disposed to intersect each other; a pixel that is disposed in correspondence with an intersection of the scanning line and the signal line and includes a liquid crystal and a pixel electrode, a common electrode, and a storage capacitor that apply a voltage to the liquid crystal; a storage capacitor line that is used for forming the storage capacitor; and a plurality of storage capacitor line driving circuits that is used for driving the storage capacitor line. The plurality of storage capacitor line driving circuits is disposed in one end and the other end of the storage capacitor line, and the electric potential of the storage capacitor line is configured to be fixed to a designated electric potential based on a reset signal that is input to the plurality of storage capacitor line driving circuits.

According to the above-described liquid crystal display device, the resistance value and the parasitic capacitance of the storage capacitor line can be decreased by disposing the plurality of the storage capacitor line driving circuits in one end and the other end of the storage capacitor line, differently from a case where the storage capacitor line is driven by one storage capacitor line driving circuit. In addition, by configuring the electric potential of the storage capacitor line to be fixed to the designated electric potential based on the reset signal input to the plurality of storage capacitor line driving circuits, application of different voltages to the storage capacitor line from the plurality of the storage capacitor line driving circuits can be suppressed. As a result, flow of a leak current from one storage capacitor line driving circuit to another storage capacitor line driving circuit through the storage capacitor line can be suppressed.

In the above-described liquid crystal display device, the designated electric potential may be configured to be fixed to either one of a first electric potential and a second electric potential that is lower than the first electric potential. In such a case, the electric potential of the higher-voltage side and the electric potential of the lower-voltage side that are used for inverting and driving the storage capacitor line can be set as the first electric potential and the second electric potential. Accordingly, the designated electric potential is not needed to be generated additionally. As a result, the configuration of the device can be simplified.

The above-described liquid crystal display device may further include a power source that is used for driving the liquid crystal display device, and the reset signal may be configured to be activated at least once from a time when the power source is in the ON state to a time when the scanning line is driven. In such a case, from a time when the power is in the ON state to a time when the scanning line is driven, the electric potential of the storage capacitor line is configured to be fixed to the designated electric potential based on the reset signal input to the plurality of storage capacitor line driving circuits. Accordingly, application of different voltages to the storage capacitor line from the plurality of storage capacitor line driving circuits can be suppressed.

In the above-described liquid crystal display device, it may be configured that a plurality of the storage capacitor lines is disposed to be aligned in the direction in which the scanning line is aligned, the plurality of storage capacitor line driving circuits is configured by circuit parts of multiple stages that are connected to the plurality of the storage capacitor lines, and the electric potentials of the plurality of the storage capacitor lines are configured to be fixed altogether based on the reset signal. In such a case, a reset operation can be performed in a speedy manner, differently from a case where the electric potentials of the plurality of the storage capacitor lines are sequentially fixed.

The above-described liquid crystal display device may further include: a reset signal line through which the reset signal is transferred; and a first transistor that has a gate connected to the reset signal line and one between a source and a drain connected to the designated electric potential, and by having the first transistor in the ON state by inputting the reset signal to the first transistor, the electric potential of the storage capacitor line may be configured to be fixed. In such a case, the electric potential of the storage capacitor line can be fixed in an easy manner.

In such a case, the above-described liquid crystal display device may further include: a latch circuit that is connected to the other between the source and the drain of the first transistor; and a second transistor that is connected to a terminal of the latch circuit, and, by inputting a signal for having the second transistor in the ON state together with inputting the reset signal to the first transistor, the electric potential of the storage capacitor line may be configured to be fixed.

The above-described liquid crystal display device may further include a scanning line driving circuit that is used for driving the scanning liner and the reset signal may be a reset signal that is input to the scanning line driving circuit. In such a case, a signal for the reset operation is not needed to be generated additionally, and accordingly, the configuration of the device can be simplified.

The above-described liquid crystal display device may further include a display unit in which a plurality of the pixels is disposed, and the plurality of storage capacitor line driving circuits may be disposed to face each other with the display unit interposed therebetween. In such a case, the plurality of storage capacitor line driving circuits can be disposed in one end and the other end of the storage capacitor line in an easy manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

First Embodiment

Figure 1:
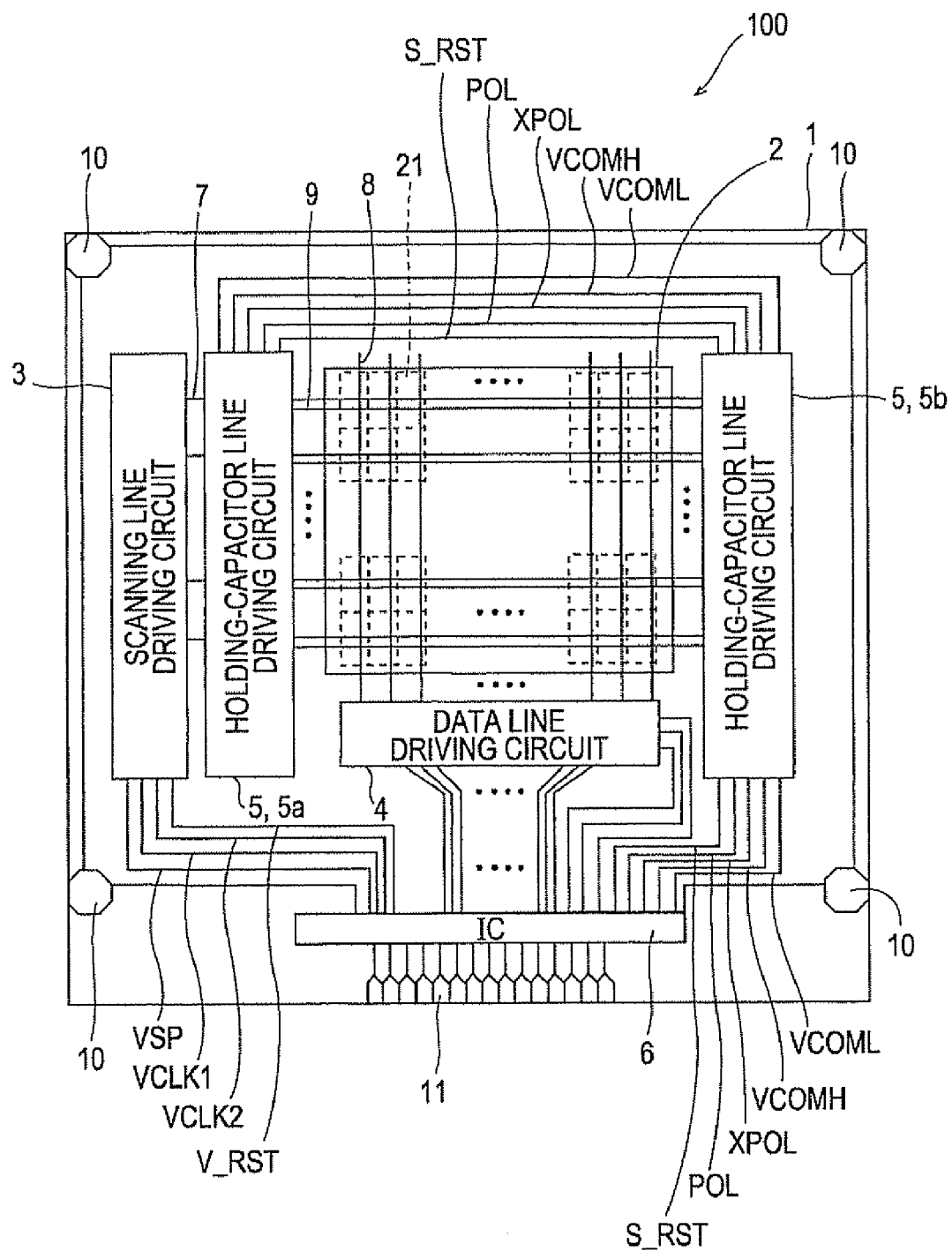
FIG. 1 is a plan view of a liquid crystal display device according to a first embodiment of the invention.
Figure 2:
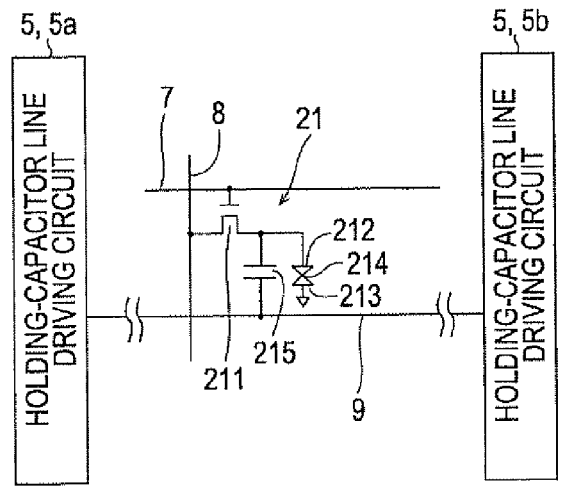
FIG. 2 is a circuit diagram of a pixel according to the first embodiment of the invention.
Figure 3:
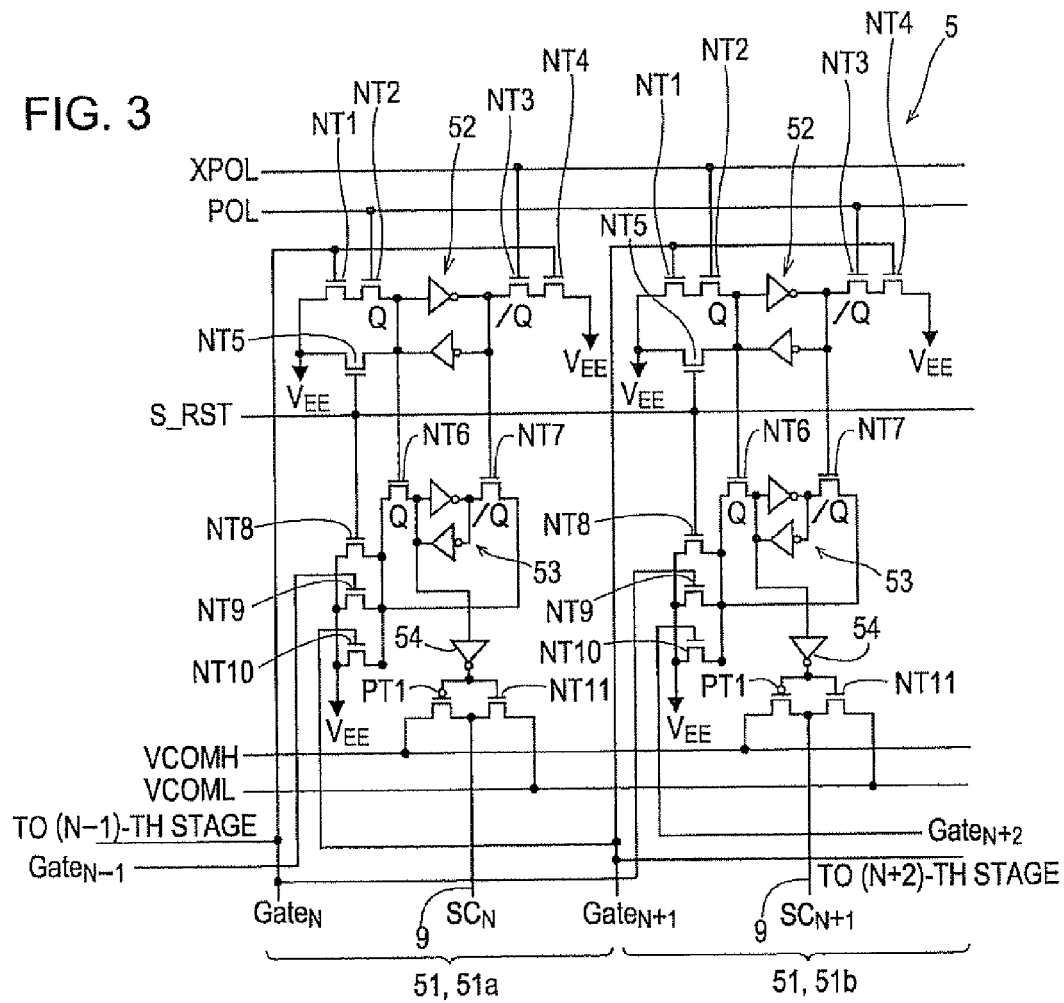
FIG. 3 is a circuit diagram of a storage capacitor line driving circuit according to the first embodiment of the invention.

FIG. 1 is a plan view of a liquid crystal display device according to a first embodiment of the invention. FIG. 2 is a circuit diagram of a pixel according to the first embodiment of the invention. FIG. 3 is a circuit diagram of a storage capacitor line driving circuit according to the first embodiment of the invention. First, the configuration of the liquid crystal display device 100 according to the first embodiment of the invention will be described with reference to FIGS. 1 to 3.

The liquid crystal display device 100 according to the first embodiment, as shown in FIG. 1, is configured by a display unit 2 formed on a substrate 1, a scanning line driving circuit 3, a data line driving circuit 4, a storage capacitor line driving circuit 5a, a storage capacitor line driving circuit 5b, and a control circuit (IC) 6. In the display unit 2, a plurality of scanning lines 7 and a plurality of data lines 8 are disposed to intersect each other. The data line 8 is an example of a "signal line" according to an embodiment of the invention. The plurality of scanning lines 7 is connected to the scanning line driving circuit 3, and the plurality of the data lines 8 is connected to the data line driving circuit 4. In addition, a plurality of storage capacitor lines 9 is disposed so as to follow the plurality of scanning lines 7. One end and the other end of each of the plurality of storage capacitor lines 9 are connected to the holding line driving circuit 5a and the storage capacitor line driving circuit 5b. In addition, in the first embodiment, the storage capacitor line driving circuit 5a and the storage capacitor line driving circuit 5b are disposed to face each other with the display unit 2 interposed therebetween.

In addition, the storage capacitor line driving circuit 5b is connected to the IC 6 and is configured to receive signals of S_RST, POL, XPOL, VCOMH and VCOML as inputs. S_RST is a reset signal, and POL is a signal for determining the polarity of a frame. XPOL is an inverted signal of POL. In addition, VCOMH is an H-level signal that is applied to the storage capacitor line 9, and VCOML is an L-level signal that is applied to the storage capacitor line 9. VCOMH and VCOML are examples of a "first electric potential" and a "second electric potential" according to an embodiment of the invention. The storage capacitor line driving circuit 5a and the storage capacitor line driving circuit 5b are connected to each other. Thus, signals of S_RST, POL, XPOL, VCOMH and VCOML are configured to be delivered from the storage capacitor line driving circuit 5b to the storage capacitor line driving circuit 5a.

In addition, the scanning line driving circuit 3 is connected to the IC 6 and is configured to receive signals of VSP, VCLK1, VCLK2 and V_RST as inputs. VSP is a start signal of the scanning line driving circuit 3. In addition, VCLK1 and VCLK2 are clock signals. V_RST is a signal for resetting the scanning line driving circuit 3.

In addition, the data line driving circuit 4 is connected to the IC 6. On the surface of the substrate 1, four contact parts 10 that are connected to a common electrode 213 to be described later are formed. The contact parts 10 are connected to the IC 6 through wirings. In addition, in an end part of the substrate 1, a connection terminal 11 that is connected to the IC 6 is formed.

As shown in FIG. 2, a pixel 21 is disposed in a position in which the scanning line 7 and the data line 8 intersect each other. The pixel 21 is configured by a transistor 211 having the gate connected to the scanning line 7 and one between the source and the drain connected to the data line 8, a pixel electrode 212 that is connected to the other between the source and the drain of the transistor 211, a common electrode 213 that is disposed to face the pixel electrode 212, a liquid crystal 214 that is disposed between the pixel electrode 212 and the common electrode 213, and the storage capacitor 215. In addition, a storage capacitor 215 is formed between the pixel electrode 212 and the storage capacitor line 9.

As shown in FIG. 3, the storage capacitor line driving circuit 5 is configured by a plurality of stages of circuit parts 51. In FIG. 3, for the simplification of the diagram, only two-staged circuit parts 51 are shown. However, actually, the circuit parts 51 corresponding to the number of the storage capacitor lines 9 are disposed.

As shown in FIG. 3, the circuit part 51 is configured by n-channel transistors NT1 to NT11, a p-channel transistor PT1, latch circuits 52 and 53, and an inverter 54. Hereinafter, the n-channel transistor and the p-channel transistor are referred to as transistors.

One between the source and the drain of the transistor NT1 is connected to the electric potential $V_{EE}$ of the lower-voltage side, and the other between the source and the drain of the transistor NT1 is connected to one between the source and the drain of the transistor NT2. The electric potential $V_{EE}$ of the lower-voltage side is an example of a "designated electric potential" according to an embodiment of the invention. In addition, the gate of the transistor NT1 is connected to $Gate_N$ and the gate of the transistor NT10 of the circuit part 51 of the former stage. In addition, the other between the source and the drain of the transistor NT2 is connected to a terminal Q of the latch circuit 52, and the gate of the transistor NT2 is connected to POL or XPOL.

In addition, one between the source and the drain of the transistor NT3 is connected to a terminal /Q of the latch circuit 52, and the other between the source and the drain of the transistor NT3 is connected to one between the source and the drain of the transistor NT4. In addition, the gate of the transistor NT3 is connected to POL or XPOL. In addition, the other between the source and the drain of the transistor NT4 is connected to the electric potential $V_{EE}$ of the lower-voltage side, and the gate of the transistor NT4 is connected to $Gate_N$ and the gate of the transistor NT10 of the circuit part 51 of the former stage.

In addition, one between the source and the drain of the transistor NT5 is connected to the electric potential $V_{EE}$ of the lower-voltage side, and the other between the source and the drain of the transistor NT5 is connected to the terminal Q of the latch circuit 52. In addition, the gate of the transistor NT5 is connected to S_RST. In addition, the transistor NT5 is an example of a "first transistor" according to an embodiment of the invention.

In addition, one between the source and the drain of the transistor NT6 is connected to the other between the source and the drain of the transistor NT8, and the other between the source and the drain of the transistor NT6 is connected to the terminal Q of the latch circuit 53. In addition, the gate of the transistor NT6 is connected to the terminal Q of the latch circuit 52. In addition, one between the source and the drain of the transistor NT7 is connected to the terminal /Q of the latch circuit 53, and the other between the source and the drain of the transistor NT7 is connected to the other between the source and the drain of the transistor NT9. In addition, the gate of the transistor NT7 is connected to the terminal /Q of the latch circuit 52.

In addition, the input terminal of the inverter 54 is connected to the terminal Q of the latch circuit 53, and the output terminal of the inverter 54 is connected to the gates of the transistors PT1 and NT11. One between the source and the drain of the transistor PT1 is connected to VCOMH. In addition, the other between the source and the drain of the transistor PT1 is connected to one between the source and the drain of the transistor NT11 and the storage capacitor line 9 ($SC_N$) of the N-th stage. One between the source and the drain of the transistor NT11 is connected to the other between the source and the drain of the transistor PT1 and the storage capacitor line 9 ($SC_N$) of the N-th stage. In addition, the other between the source and the drain of the transistor NT11 is connected to VCOML.

In addition, one between the source and the drain of the transistor NT8 is connected to the electric potential $V_{EE}$ of the lower-voltage side, and the other between the source and the drain of the transistor NT8 is connected to one between the source and the drain of the transistor NT6. In addition, the gate of the transistor NT8 is connected to S_RST.

In addition, one between the source and the drain of the transistor NT9 is connected to the electric potential $V_{EE}$ of the lower-voltage side, and the other between the source and the drain of the transistor NT9 is connected to the other between the source and the drain of the transistor NT7. In addition, the gate of the transistor NT9 is connected to $Gate_{N-1}$ of the former stage.

In addition, one between the source and the drain of the transistor NT10 is connected to the electric potential $V_{EE}$ of the lower-voltage side, and the other between the source and the drain of the transistor NT10 is connected to the other between the source and the drain of the transistor NT7. In addition, the gate of the transistor NT10 is connected to $Gate_{N+1}$ of the latter stage.

Figure 4:
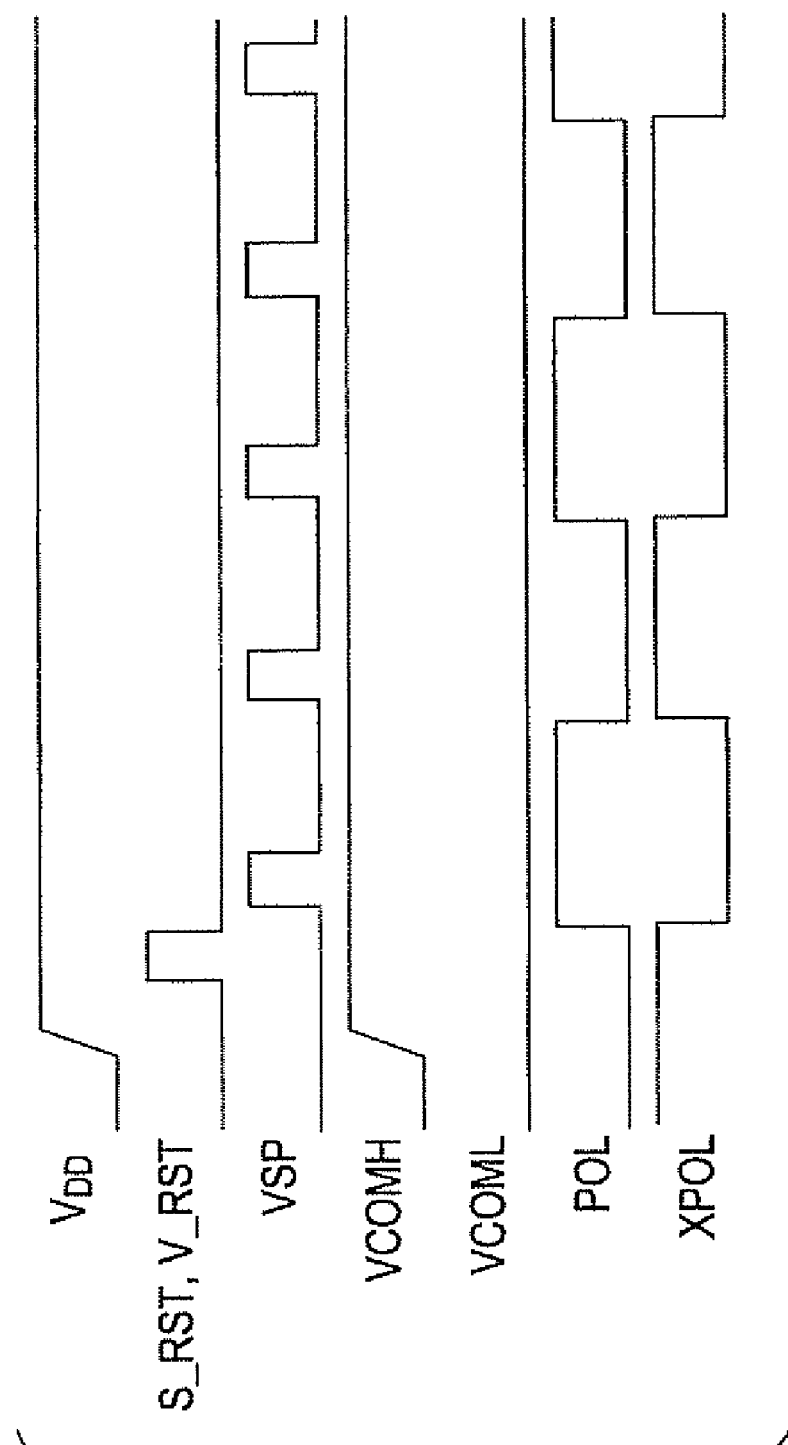
FIG. 4 is a signal waveform diagram for describing a driving operation of the storage capacitor line driving circuit according to the first embodiment of the invention.

FIG. 4 is a signal waveform diagram for describing the driving operation of the storage capacitor line driving circuit according to the first embodiment of the invention. Next, a reset operation of the storage capacitor line driving circuit 5 according to the first embodiment of the invention will be described with reference to FIGS. 3 and 4.

First, as shown in FIG. 4, as the power $V_{DD}$ rises, VCOMH rises. Next, according to the first embodiment, S_RST (reset signal) becomes the H level (High, Active) only once. The reset signal is the output of the IC 6 that detects the electric potential of the external power all the time. When the electric potential of the power source is equal to or higher than a predetermined value, the power $V_{DD}$ rises, and accordingly, the reset signal becomes to have the active state (for example, High Active). Accordingly, the transistor NT5 shown in FIG. 3 becomes to have the ON state, and the transistor NT8 becomes to have the ON state. As a result, the electric potential of the terminal Q side of the latch circuit 52 becomes $V_{EE}$ (L level), and the electric potential of the terminal /Q becomes to have the H level. Accordingly, the transistor NT6 is maintained to be in the OFF state, and the transistor NT7 becomes to have the ON state.

Then, since the transistor NT8 is in the ON state, the electric potential of the terminal /Q of the latch circuit 53 becomes to have the L level, and the electric potential of the terminal Q becomes to have the H level. Then, the electric potential of the input terminal of the inverter 54 becomes to have the H level, and thereby the electric potential of the output terminal becomes to have the L level. As a result, the transistor PT1 becomes to have the ON state, and the transistor NT11 becomes to have the OFF state. Then, according to the first embodiment, VCOMH is applied to the storage capacitor line 9 ($SC_N$). In addition, similarly, VCOMH is applied to the storage capacitor line 9 ($SC_{N+1}$) of the latter stage.

As described above, according to the first embodiment, by inputting the reset signal, the electric potentials of a plurality of the storage capacitor lines 9 are fixed (reset) to VCOMH all together.

Figure 5:
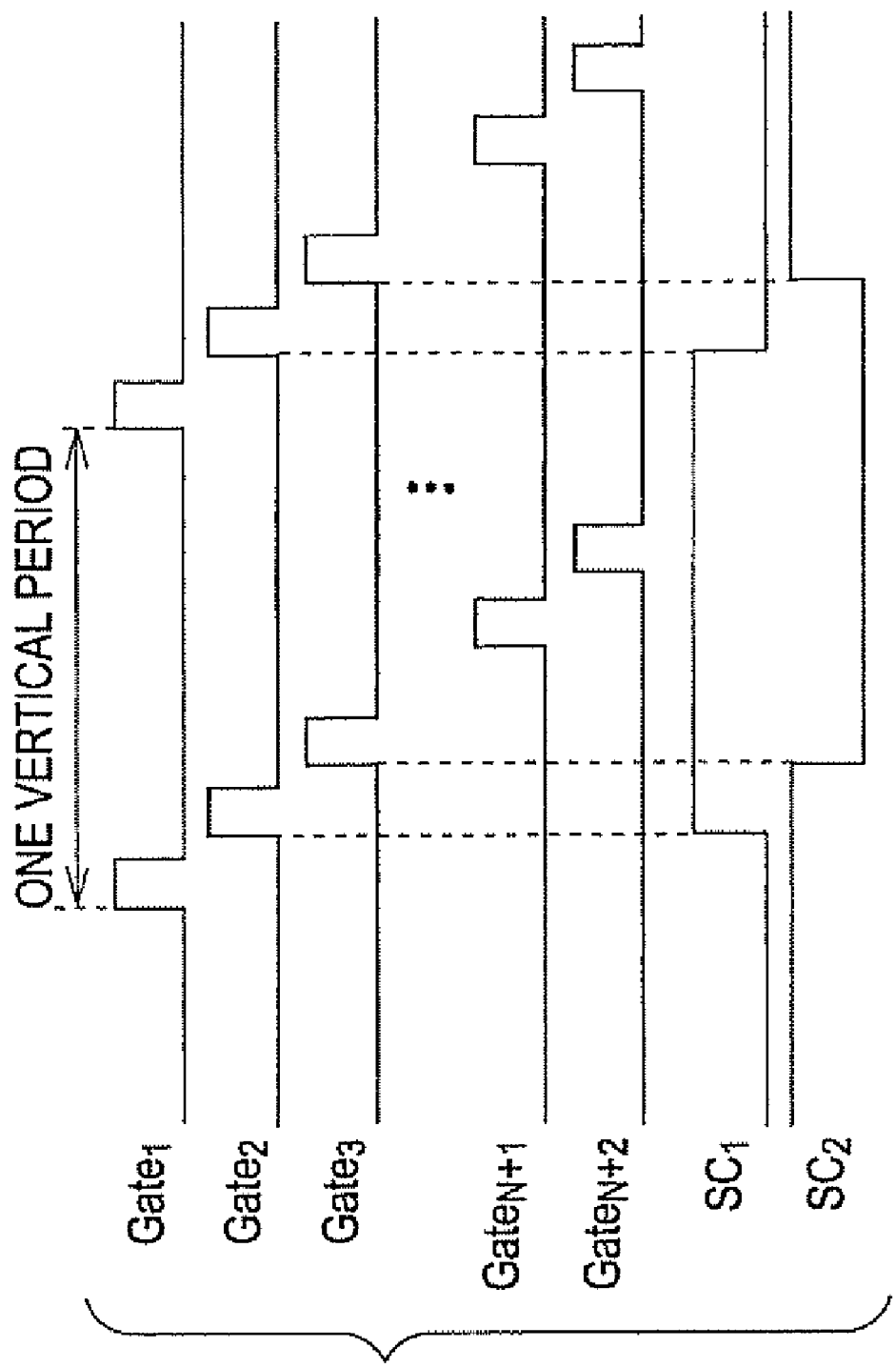
FIG. 5 is a signal waveform diagram for describing a driving operation of the storage capacitor line driving circuit according to the first embodiment of the invention.

FIG. 5 is a signal waveform diagram for describing the driving operation of the storage capacitor line driving circuit according to the first embodiment of the invention. Next, the operation of the holding line driving circuit 5 according to the first embodiment of the invention will be described with reference to FIGS. 3, 4 and 5.

First, as shown in FIG. 4, after S_RST falls from the H level to the L level, POL rises to the H level, and XPOL falls to the L level. Accordingly, the gate of the transistor NT2 shown in FIG. 3 becomes to have the ON state, and the gate of the transistor NT3 becomes to have the OFF state. Then, as shown in FIG. 5, an H-level signal is applied to Gate$_1$(N). Accordingly, the transistor NT1 and the transistor NT4 become to have the ON state. As a result, the electric potential of the terminal Q side of the latch circuit 52 becomes to have the L level, and the electric potential of the terminal /Q side becomes to have the H level. Accordingly, the transistor NT6 is maintained to have the OFF state, and the transistor NT7 becomes to have the ON state.

Then, when the circuit part 51 of the former stage is scanned, the transistor NT9 having the gate to be connected to Gate$_{N-1}$ is in the ON state. As a result, the electric potential of the other between the source and the drain of the transistor NT7 has the L level. Accordingly, the transistor NT7 becomes to have the ON state, and thus, the electric potential of the terminal /Q of the latch circuit 53 becomes to have the L level, and the electric potential of the terminal Q becomes the H level.

Then, as the electric potential of the input terminal of the inverter 54 becomes to have the H level, the electric potential of the output terminal becomes to have the L level. As a result, the transistor PT1 becomes to have the ON state, and the transistor NT11 becomes to have the OFF state. Then, VCOMH is applied to the storage capacitor line 9 (SC$_N$).

At this moment, in the circuit part 51b, differently from the circuit part 51a, the gate of the transistor NT2 is connected to XPOL, and the gate of the transistor NT3 is connected to POL. Accordingly, in the latch circuits 52 and 53 of the circuit part 51b, signals having the polarity opposite to that of the latch circuits 52 and 53 of the circuit part 51a are stored. The circuit part 51a and the circuit part 51b are disposed alternately. Then, as the Gate$_{N+1}$ of the circuit part 51b of the latter stage becomes to have the H level, a voltage (VCOMH or VCOML) having the polarity different from that of SC$_{N-1}$ is applied to the storage capacitor line 9 (SC$_N$) from the circuit part 51a of the former stage. Accordingly, the polarities of voltages applied to the storage capacitor lines 9 located in adjacent rows are different from each other. In addition, as the signal of Gate$_{N+1}$ of the circuit part 51b of the latter stage is received, and the voltage (VCOMH or VCOML) is applied to the storage capacitor line 9 (SC$_N$) from the circuit part 51a of the former stage. Accordingly, as shown in FIG. 5, when a predetermined period elapsed after the signal is applied to SC$_N$ (SC$_1$), a signal is applied to SC$_{N+1}$ (SC$_2$).

Then, after one vertical period elapses, the signals of POL and XPOL are inverted, and VSP becomes to have the H level again. Accordingly, a voltage having the polarity opposite to that of the voltage applied in the previous vertical period is applied to the storage capacitor line 9.

According to the first embodiment, as described above, by disposing two storage capacitor line driving circuits 5a and 5b in one end and the other end of each storage capacitor line 9, the resistance value and the parasitic capacitance of each storage capacitor line 9 can be set to be smaller than those of a case where the storage capacitor lines 9 are driven by one storage capacitor line driving circuit. In addition, by configuring the electric potential of each storage capacitor line 9 to be fixed to VCOMH based on the reset signal that is input to two storage capacitor line driving circuits 5a and 5b, application of different voltages to the storage capacitor line 9 from two storage capacitor line driving circuits 5a and 5b can be suppressed. Accordingly, a leak current flowing through the storage capacitor line 9 from the storage capacitor line driving circuit 5a (5b) to the storage capacitor line driving circuit 5b (5a) can be suppressed.

In addition, according to the first embodiment, as described above, the electric potential to which the storage capacitor line 9 is fixed is set to VCOMH, and accordingly, VCOMH that is the electric potential of the high voltage side for driving the storage capacitor line 9 to be inverted can be used as the electric potential for resetting the storage capacitor line 9. Thus, an electric potential for resetting the storage capacitor line 9 is not needed to be generated additionally. Accordingly, the configuration of the liquid crystal display device 100 can be simplified.

In addition, according to the first embodiment, as described above, the reset signal is configured to be activated once after power V$_{DD}$ becomes to have the ON state until the scanning line 7 is driven, and thus, a reset operation can be performed by performing a minimum operation. Accordingly, low power consumption can be implemented. Alternatively, the reset signal may be activated a plurality of times after the power V$_{DD}$ becomes to have the ON state until the scanning line 7 is driven. In such a case, the reset operation can be performed more assuredly.

In addition, according to the first embodiment, as described above, the electric potentials of the plurality of the storage capacitor lines 9 are configured to be fixed all together based on the reset signal, and thus, the reset operation can be performed in a speedy manner, compared to a case where the electric potentials of the plurality of the storage capacitor lines 9 are sequentially fixed.

In addition, according to the first embodiment, as described above, by inputting the reset signal to the transistor NT5, the transistor NT5 becomes to have the ON state. Thereby, by configuring the electric potentials of the storage capacitor lines 9 to be fixed, the electric potentials of the storage capacitor lines 9 can be fixed in an easy manner.

In addition, according to the first embodiment, as described above, by disposing two storage capacitor line driving circuits 5a and 5b to face each other with the display unit 2 interposed therebetween, the storage capacitor line driving circuits 5a and 5b can be disposed in one end and the other end of each storage capacitor line 9 in an easy manner.

Second Embodiment

Figure 6:
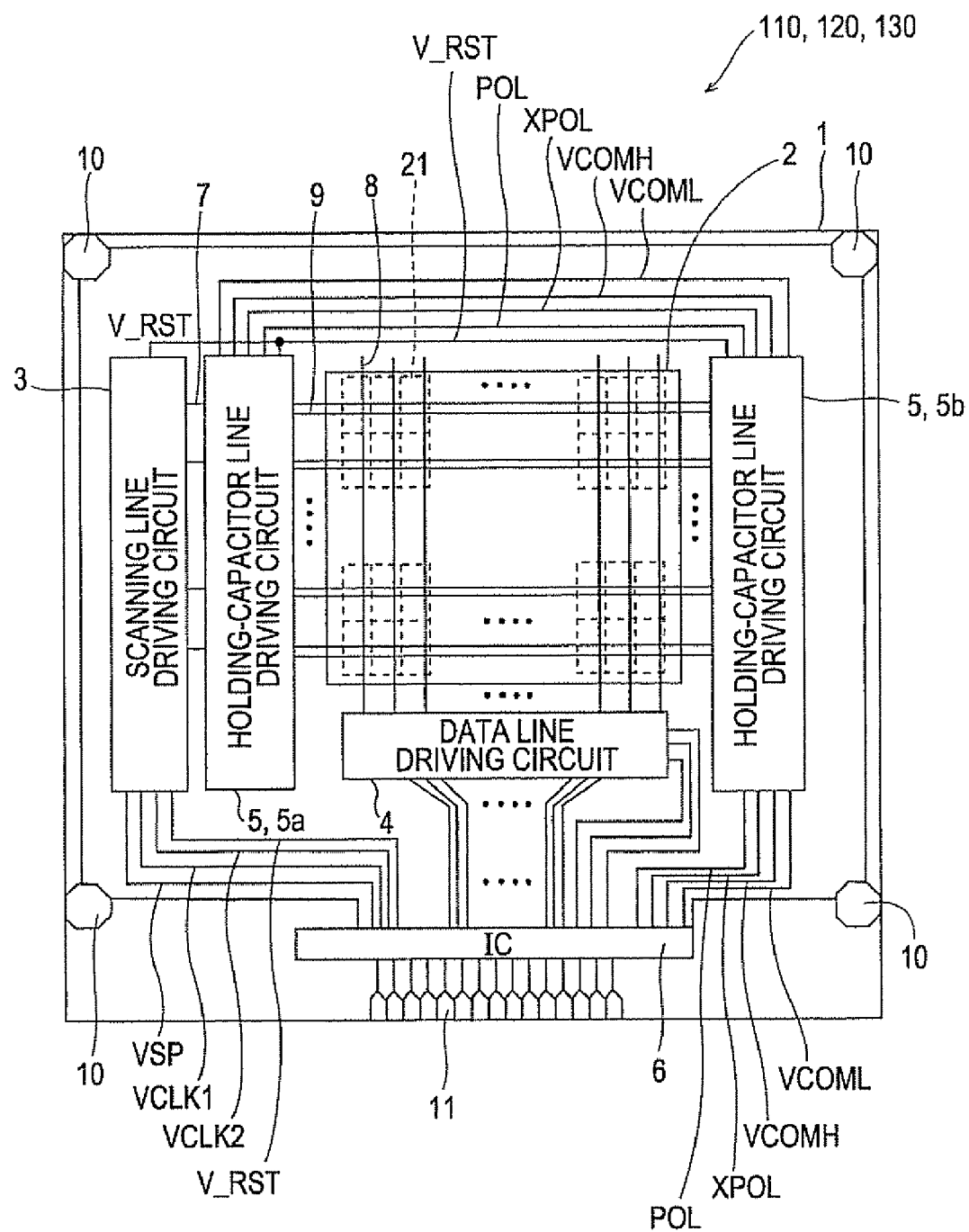
FIG. 6 is a plan view of a liquid crystal display device according to a second embodiment of the invention.

FIG. 6 is a plan view of a liquid crystal display device according to a second embodiment of the invention. Next, in the second embodiment, the liquid crystal display device 110 in which the storage capacitor line driving circuit 5 is reset by an input signal that is input to the scanning line driving circuit 3, differently from the above-described first embodiment, will be described with reference to FIG. 6.

In the liquid crystal display device 110 according to the second embodiment, as shown in FIG. 6, the storage capacitor line driving circuit 5a, the storage capacitor line driving circuit 5b, and the scanning line driving circuit 3 are configured to receive V_RST as inputs. In addition, the storage capacitor line driving circuit 5 is configured to be reset based on a reset signal V_RST that is input to the scanning line driving circuit 3.

The other configurations and operations of the second embodiment are the same as those of the first embodiment.

According to the second embodiment, as described above, the reset signal input to the storage capacitor line driving circuit 5 is commonly used as the reset signal input to the scanning line driving circuit 3. Accordingly, a signal used for reset is not needed to be generated additionally, and therefore the configuration of the liquid crystal display device 110 can be simplified.

The other advantages of the second embodiment are the same as those of the first embodiment.

Third Embodiment

Figure 7:
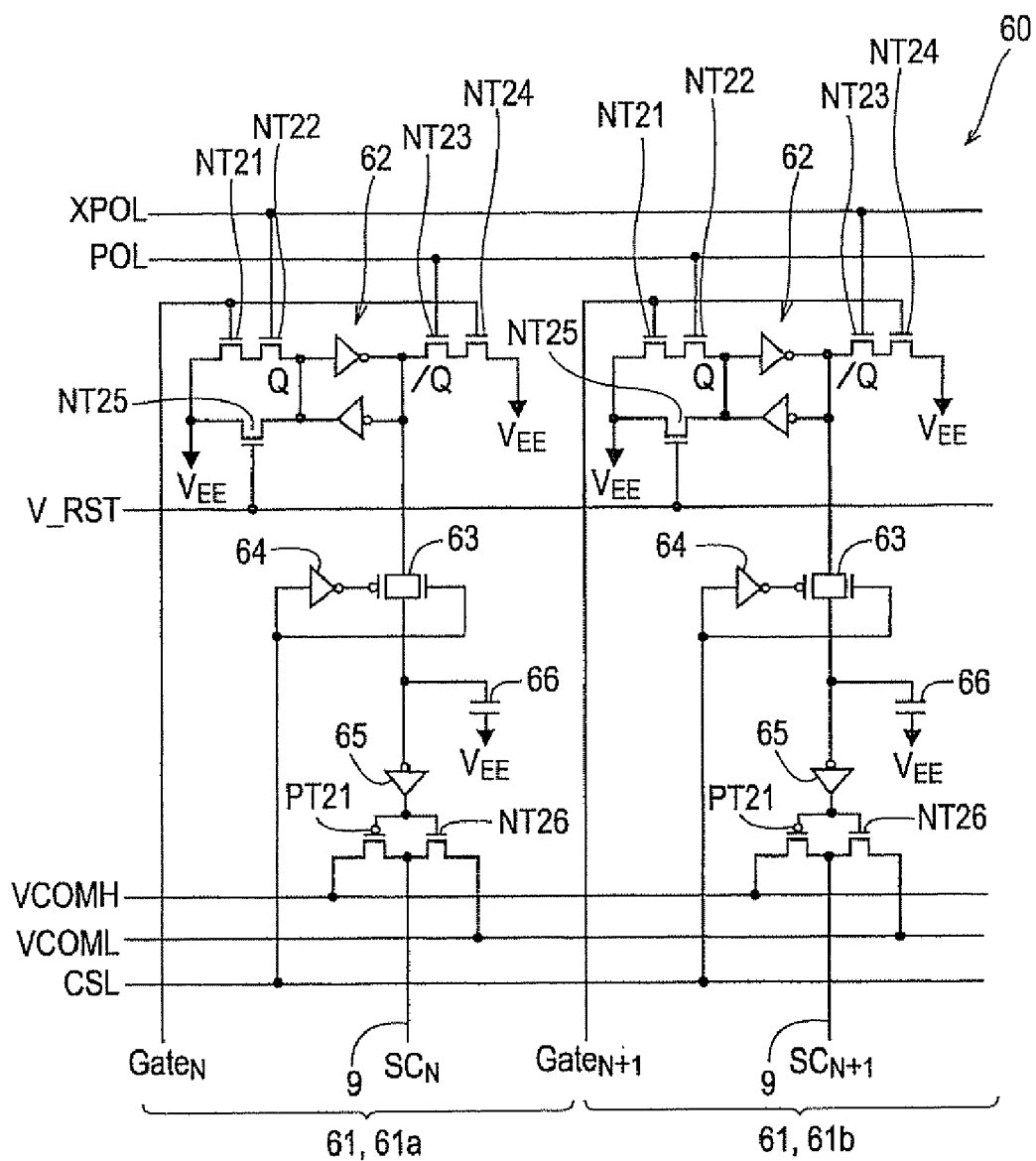
FIG. 7 is a circuit diagram of a storage capacitor line driving circuit according to a third embodiment of the invention.

FIG. 7 is a circuit diagram of a storage capacitor line driving circuit according to a third embodiment of the invention. Next, in the third embodiment, a liquid crystal display device 120 in which a capacitor 66 used for delaying the timing for application of a voltage to the storage capacitor line 9 is disposed, differently from the first embodiment, will be described with reference to FIG. 7.

The entire configuration of the liquid crystal display device 120 according to the third embodiment is the same as that according to the second embodiment shown in FIG. 6.

As shown in FIG. 7, a storage capacitor line driving circuit 60 is configured by a plurality of stages of circuit parts 61. The circuit part 61 is configured by n-channel transistors NT21 to NT26, a p-channel transistor PT21, a latch circuit 62, a transmission gate 63, an inverter 64, an inverter 65, and a capacitor 66. The transistor NT25 is an example of the "first transistor" according to an embodiment of the invention, and the transmission gate 63 is an example of the "second transistor" according to an embodiment of the invention.

The configurations of the transistors NT21 to NT25 and the latch circuit 62 are the same as those of the transistors NT1 to NT5 and the latch circuit 52 (see FIG. 3) according to the above-described first embodiment.

To the terminal /Q of the latch circuit 62, the transmission gate 63 is connected. To the gate of the p-channel transistor of the transmission gate 63, the output terminal of the inverter 64 is connected. In addition, to the gate of the n-channel transistor of the transmission gate 63, the input terminal of the inverter 64 is connected. To the input terminal of the inverter 64, CSL is connected. In addition, to a terminal of the transmission gate 63 which is opposite to the side to which the terminal /Q of the latch circuit 62 is connected, the input terminal of the inverter 65 and the capacitor 66 are connected. To the output terminal of the inverter 65, the gate of the transistor PT21 and the gate of the transistor NT26 are connected.

To one between the source and the drain of the transistor PT21, VCOMH is connected. In addition, to the other between the source and the drain of the transistor PT21, one between the source and the drain of the transistor NT26 and the storage capacitor line 9 ($SC_N$) is connected. In addition, to the other between the source and the drain of the transistor NT26, VCOML is connected.

Figure 8:
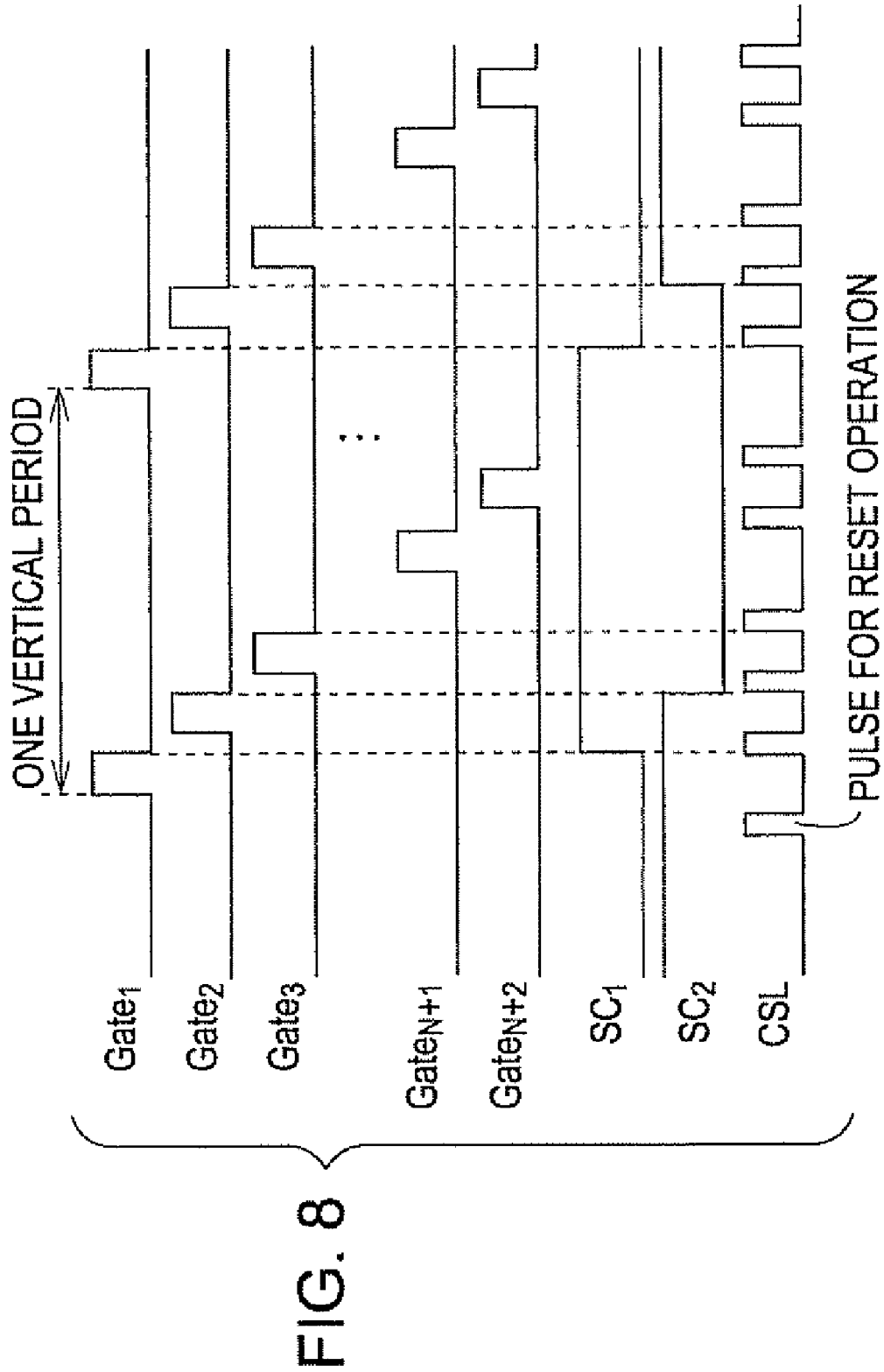
FIG. 8 is a signal waveform diagram for describing a driving operation of the storage capacitor line driving circuit according to the third embodiment of the invention.

FIG. 8 is a signal waveform diagram for describing the driving operation of the storage capacitor line driving circuit according to the third embodiment of the invention. Next, the reset operation of the storage capacitor line driving circuit 60 according to the third embodiment of the invention will be described with reference to FIGS. 4, 7, and 8.

First, as shown in FIG. 4, as the power $V_{DD}$ rises, VCOMH rises. Next, the V_RST signal (reset signal) is activated (High, Active) only once. Accordingly, the transistor NT25 shown in FIG. 7 is in the ON state. As a result, the electric potential of the terminal Q side of the latch circuit 62 becomes to have the L level, and the electric potential of the terminal /Q side becomes to have the H level.

Then, as shown in FIG. 8, an H-level signal for a reset operation is applied to CSL. Accordingly, the input terminal side of the inverter 64 becomes to have the H level, and the output terminal side of the inverter 64 becomes to have the L level. In addition, the gate side of the n-channel transistor of the transmission gate 63 becomes to have the H level. As a result, the transmission gate 63 is in the ON state, and the input terminal side of the inverter 65 becomes to have the H level that is the same as that of the terminal /Q of the latch circuit 62. At this moment, the H-level voltage is also applied to one electrode of the capacitor 66, and electric charges are accumulated in the capacitor 66. In addition, as the input terminal side of the inverter 65 becomes to have the H level, the output terminal side of the inverter 65 becomes to have the L level. Accordingly, the transistor PT21 is in the ON state, and VCOMH is applied to the storage capacitor line 9 ($SC_N$). In addition, VCOMH is applied also to the storage capacitor line 9 ($SC_{N+1}$).

As described above, in the third embodiment, as in the first embodiment, by inputting the reset signal, the electric potentials of the plurality of the storage capacitor lines 9 are fixed (reset) to VCOMH altogether.

Next, the operation of the storage capacitor line driving circuit 60 according to the third embodiment of the invention will be described with reference to FIGS. 4, 7, and 8.

First, as shown in FIG. 4, after V_RST falls to the L level from the H level, POL rises to the H level, and simultaneously XPOL falls to the L level. Accordingly, the gate of the transistor NT23 shown in FIG. 7 is in the ON state, and the gate of the transistor NT22 is in the OFF state.

Next, as shown in FIG. 8, $Gate_N$ is in the ON state. Accordingly, the transistor NT21 and the transistor NT24 are in the ON state. As a result, the electric potential of the terminal /Q side of the latch circuit 62 becomes to have the L level, and the electric potential of the terminal Q side of the latch circuit 62 becomes to have the H level.

Then, as shown in FIG. 8, CSL rises to the H level. Accordingly, as described above, the transmission gate 63 is in the ON state, and the input terminal side of the inverter 65 becomes to have the L level that is the same as that of the terminal /Q of the latch circuit 62. At this moment, the L-level voltage is applied to one electrode of the capacitor 66. In addition, as the input terminal side of the inverter 65 becomes to have the L level, the output terminal side of the inverter 65 becomes to have the H level. Accordingly, the transistor NT26 is in the ON state, and thus, VCOML is applied to the storage capacitor line 9 ($SC_N$).

Since the gate of the transistor NT22 of the circuit part 61b of the latter stage is connected to POL, and the gate of the transistor NT23 of the circuit part 61b of the latter stage is connected to XPOL, differently from those of the circuit part 61a of the former stage, a signal having the polarity opposite to that of the signal accumulated in the latch circuit 62 of the circuit part 61a of the former stage is stored in the latch circuit 62 of the circuit part 61b of the latter stage. Accordingly, to the storage capacitor line 9 ($SC_{N+1}$) of the circuit part 61b of the latter stage, VCOMH that has the polarity different from that of $SC_N$ is applied. Accordingly, the polarities of voltages applied to the storage capacitor lines 9 in adjacent rows become different from each other.

In addition, the advantages of the third embodiment are the same as those of the first or second embodiment.

Fourth Embodiment

Figure 9:
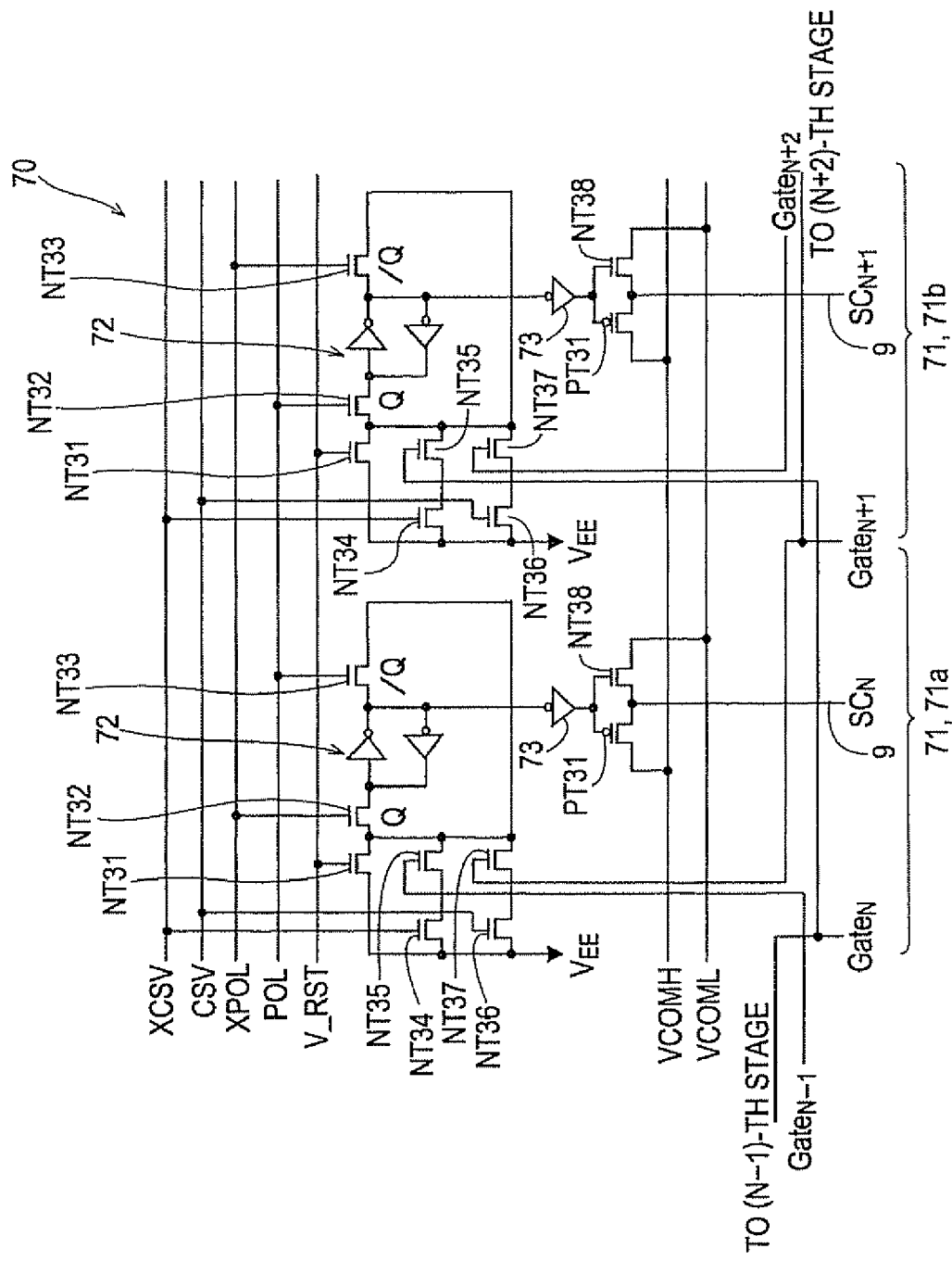
FIG. 9 is a circuit diagram of a storage capacitor line driving circuit according to a fourth embodiment of the invention.

FIG. 9 is a circuit diagram of a storage capacitor line driving circuit according to a fourth embodiment of the invention. Next, in the fourth embodiment, a liquid crystal display device 130 in which only one latch circuit 72 is included in a circuit part 71 of a storage capacitor line driving circuit 70, differently from the first embodiment, will be described with reference to FIG. 9.

The entire configuration of the liquid crystal display device 130 according to the fourth embodiment is the same as that according to the second embodiment shown in FIG. 6.

As shown in FIG. 9, the storage capacitor line driving circuit 70 is configured by a plurality of stages of circuit parts 71. The circuit part 71 is configured by n-channel transistors NT31 to NT38, a p-channel transistor PT31, a latch circuit 72, and an inverter 73. The transistor NT31 is an example of the "first transistor" according to an embodiment of the invention.

One between the source and the drain of the transistor NT31 is connected to the electric potential $V_{EE}$ of the lower-voltage side, and the other between the source and the drain of the transistor NT31 is connected to one between the source and the drain of the transistor NT32. In addition, the gate of the transistor NT31 is connected to V_RST. The other between the source and the drain of the transistor NT32 is connected to the terminal Q of the latch circuit 72, and the gate of the transistor NT32 is connected to XPOL or POL.

One between the source and the drain of the transistor NT33 is connected to the terminal /Q of the latch circuit 72, and the other between the source and the drain of the transistor NT33 is connected to the other between the source and the drain of the transistor NT37. In addition, the gate of the transistor NT33 is connected to POL or XPOL.

One between the source and the drain of the transistor NT34 is connected to the electric potential $V_{EE}$ of the lower-voltage side, and the other between the source and the drain of the transistor NT34 is connected to one between the source and the drain of the transistor NT35. In addition, the gate of the transistor NT34 is connected to XCSV. XCSV and CSV to be described later are signals for changing the scanning direction of the storage capacitor line driving circuit 70. In addition, the other between the source and the drain of the transistor NT35 is connected to the other between the source and the drain of the transistor NT37, and the gate of the transistor NT35 is connected to $Gate_{N-1}$ to which a driving signal of the circuit part 71 of the former stage is input.

One between the source and the drain of the transistor NT36 is connected to the electric potential $V_{EE}$ of the lower-voltage side, and the other between the source and the drain of the transistor NT36 is connected to one between the source and the drain of the transistor NT37. In addition, the gate of the transistor NT36 is connected to CSV. In addition, the other between the source and the drain of the transistor NT37 is connected to the other between the source and the drain of the transistor NT35, and the gate of the transistor NT37 is connected to $Gate_{N+1}$ to which a driving signal of the circuit part 71b of the latter stage is input.

To the terminal /Q of the latch circuit 72, the input terminal of the inverter 73 is connected. To the output terminal of the inverter 73, the gate of the transistor PT31 and the gate of the transistor NT38 are connected.

To one between the source and the drain of the transistor PT31, VCOMH is connected. In addition, to the other between the source and the drain of the transistor PT31, one between the source and the drain of the transistor NT38 and the storage capacitor line 9 ($SC_N$) are connected. To the other between the source and the drain of the transistor NT38, VCOML is connected.

Figure 10:
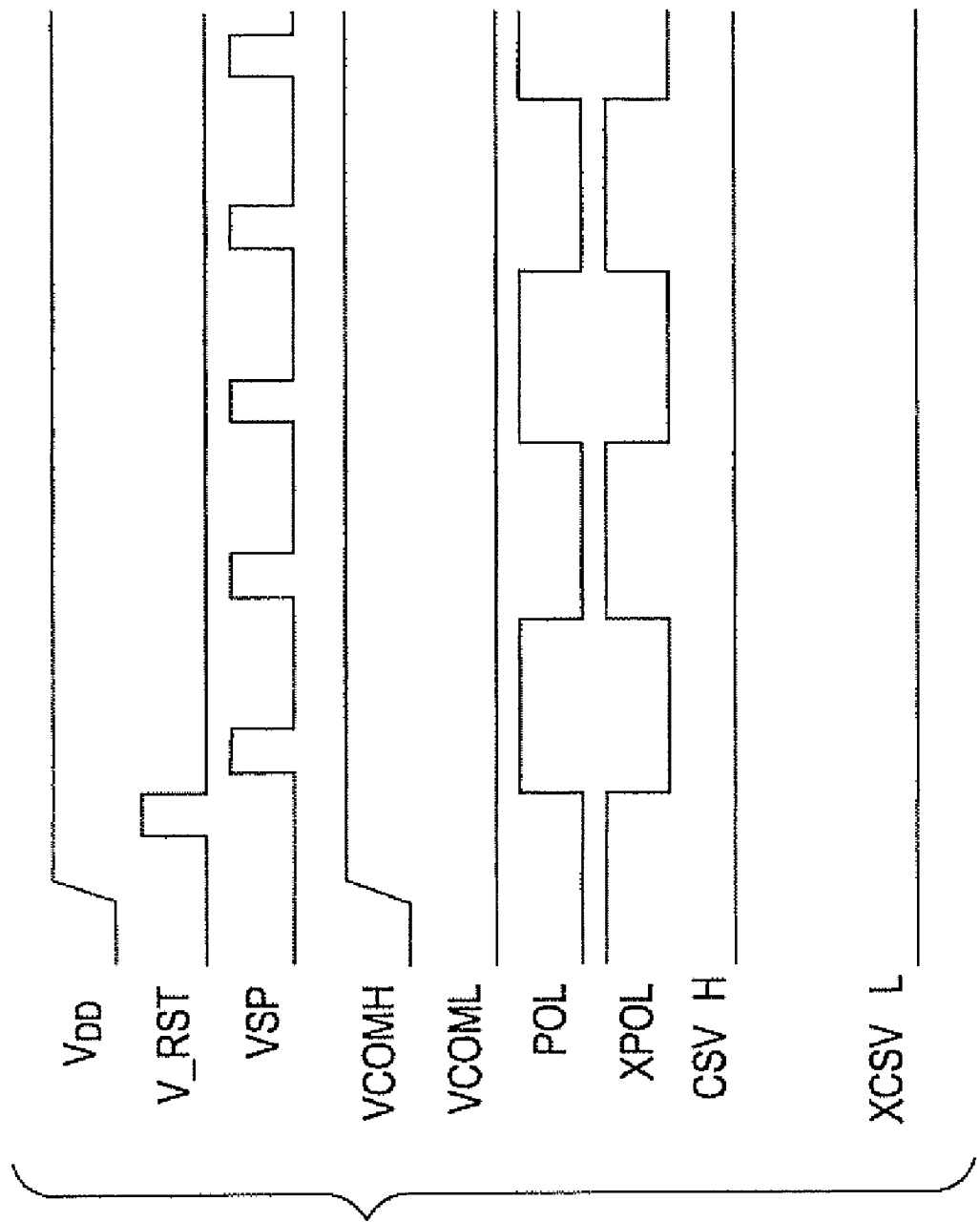
FIG. 10 is a signal waveform diagram for describing a driving operation of the storage capacitor line driving circuit according to the fourth embodiment of the invention.

FIG. 10 is a signal waveform diagram for describing the driving operation of the storage capacitor line driving circuit according to the fourth embodiment of the invention. Next, the reset operation of the storage capacitor line driving circuit 70 according to the fourth embodiment of the invention will be described with reference to FIGS. 9 and 10.

First, as shown in FIG. 10, as the power $V_{DD}$ rises, VCOMH rises. Next, the V_RST signal (reset signal) is activated (High, Active) only once. Accordingly, the transistor NT31 shown in FIG. 9 is in the ON state. At this moment, since XPOL has the H level, the transistor NT32 is in the ON state. As a result, the electric potential of the terminal Q side of the latch circuit 72 becomes to have the L level, and the electric potential of the terminal /Q side becomes to have the H level.

Then, the input terminal side of the inverter 73 becomes to have the H level that is the same as that of the terminal /Q of the latch circuit 72, and accordingly, the output terminal side of the inverter 73 becomes to have the L level. Accordingly, the transistor PT31 is in the ON state, and VCOMH is applied to the storage capacitor line 9 ($SC_N$). In addition, VCOMH is applied also to the storage capacitor line 9 ($SC_{N+1}$).

As described above, in the fourth embodiment, as in the first embodiment, by inputting the reset signal, the electric potentials of the plurality of the storage capacitor lines 9 are fixed (reset) to VCOMH altogether.

Next, the operation of the storage capacitor line driving circuit 70 according to the fourth embodiment of the invention will be described with reference to FIGS. 8, 9, and 10.

First, as shown in FIG. 10, after V_RST falls to the L level from the H level, POL rises to the H level, and simultaneously XPOL falls to the L level. Accordingly, the gate of the transistor NT33 shown in FIG. 9 is in the ON state, and the gate of the transistor NT32 is in the OFF state. At this moment, CSV and XCSV become to have the H-level and the L-level. Accordingly, the transistor NT36 is in the ON state, and the transistor NT34 is in the OFF state.

Next, as shown in FIG. 8, $Gate_{N+1}$ is in the ON state. Accordingly, the transistor NT37 is in the ON state. As a result, the electric potential of the terminal /Q side of the latch circuit 72 becomes to have the L level, and the electric potential of the terminal Q side of the latch circuit 72 becomes to have the H level.

Then, as the input terminal side of the inverter 73 becomes to have the L level that is the same as that of the terminal /Q of the latch circuit 72, the output terminal side of the inverter 73 becomes to have the H level. Accordingly, the transistor NT38 is in the ON state, and VCOML is applied to the storage capacitor line 9 ($SC_N$).

Since the gate of the transistor NT32 of the circuit part 71b of the latter stage is connected to POL and the gate of the transistor NT33 of the circuit part 71b of the latter stage is connected to XPOL, differently from those of the circuit part 71a of the former stage, a signal having the polarity opposite to that of the signal accumulated in the latch circuit 72 of the circuit part 71a of the former stage is stored in the latch circuit 72 of the circuit part 71b of the latter stage. Accordingly, to the storage capacitor line 9 ($SC_{N+1}$) of the circuit part 71b of the latter stage, VCOMH that has the polarity different from that of $SC_N$ is applied. Accordingly, the polarities of voltages applied to the storage capacitor lines 9 in adjacent rows become different from each other. As described above, after the signal of $Gate_{N+1}$ of the circuit part 71b of the latter stage is received and a predetermined time elapses after VCOML is applied to the storage capacitor line 9 ($SC_N$) from the circuit part 71a of the former stage, a signal is applied to $SC_{N+1}$.

In the fourth embodiment, as described above, one latch circuit 72 is disposed in the circuit part 71, differently from the above-described first embodiment in which two latch circuits 52 and 53 (see FIG. 3) are disposed, and accordingly, the configuration of the circuit can be simplified. In addition, the number of n-channel transistors (eight of NT31 to NT38) according to the fourth embodiment can be configured to be smaller than that according to the first embodiment (eleven of NT1 to NT11).

In addition, other advantages of the fourth embodiment are the same as those of the first or second embodiment described above.

The embodiments described above should be considered not to be limited but to be exemplified in every viewpoint. The scope of the invention is represented not by Description of Exemplary Embodiments but by the claims. In addition, any change within the equivalent scope or the scope of the claims belongs to the scope of the invention.

For example, in the above-described first to fourth embodiments, an example in which the storage capacitor line is fixed (reset) to the electric potential of VCOMH after the power is input is shown. However, the invention is not limited thereto, and the storage capacitor line may be fixed to the electric potential of VCOML.

In addition, in the above-described first to fourth embodiments, an example in which one between the source and the drain of the transistors NT5, NT25, and NT31 having the gate, to which the reset signal S_RST (V_RST) is input, is connected, to $V_{EE}$ as the electric potential of the lower-voltage side is shown. However, the invention is not limited thereto. Thus, instead of the transistors NT5, NT25, and NT31 having the gate, to which the reset signal S_RST (V_RST) is input, one between the source and the drain of a p-channel transistor may be connected to the electric potential of the higher-voltage side by using the p-channel transistor. In such a case, the reset signal S_RST (V_RST) becomes a signal of low activation.

In addition, in the above-described third embodiment, an example in which as a transistor, which is connected to the terminal /Q side of the latch circuit 62 and CSL is input to, the transmission gate 63 is used is shown. However, the invention is not limited thereto. Thus, an element other than the transmission gate may be used as long as the element can be ON or OFF controlled in accordance with CSL.

The entire disclosure of Japanese Patent Application No. 2008-065350, filed Mar. 14, 2008 is expressly incorporated by reference herein.

What is claimed is:

1. A liquid crystal device comprising:
   a scanning line and a signal line that are disposed to intersect each other;
   a pixel that is disposed in correspondence with an intersection of the scanning line and the signal line and includes a liquid crystal and a pixel electrode, a common electrode, and a storage capacitor that apply a voltage to the liquid crystal;
   a storage capacitor line that is disposed to be aligned in the direction in which the scanning line is aligned and is used for forming the storage capacitor; and
   a plurality of storage capacitor line driving circuits that is used for driving the storage capacitor line,
   wherein the plurality of storage capacitor line driving circuits is configured by a plurality of circuit parts, each of which is connected to the plurality of the storage capacitor lines and is disposed in one end and the other end of the storage capacitor line, and
   wherein the electric potentials of the plurality of the storage capacitor lines are configured to be fixed altogether to a designated electric potential based on a reset signal that is input to the plurality of storage capacitor line driving circuits.

2. The liquid crystal display device according to claim 1, claim 1, further comprising a scanning line driving circuit that is used for driving the scanning line,
   wherein the reset signal is a reset signal that is input to the scanning line driving circuit.

3. A liquid crystal display device comprising:
   a scanning line and a signal line that are disposed to intersect each other;
   a pixel that is disposed in correspondence with an intersection of the scanning line and the signal line and includes a liquid crystal and a pixel electrode, a common electrode, and a storage capacitor that apply a voltage to the liquid crystal;
   a storage capacitor line that is used for forming the storage capacitor;
   a plurality of storage capacitor line driving circuits that is used for driving the storage capacitor line;
   a reset signal line through which the reset signal is transferred; and
   a first transistor that has a gate connected to the reset signal line and one between a source and a drain connected to the designated electric potential,
   wherein the plurality of storage capacitor line driving circuits is disposed in one end and the other end of the storage capacitor line,
   wherein the electric potential of the storage capacitor line is configured to be fixed to a designated electric potential based on a reset signal that is input to the plurality of storage capacitor line driving circuits, and
   wherein the electric potential of the storage capacitor line is configured to be fixed by having the first transistor in the ON state by inputting the reset signal to the first transistor.

4. The liquid crystal display device according to claim 3, further comprising:
   a latch circuit that is connected to the other between the source and the drain of the first transistor; and
   a second transistor that is connected to a terminal of the latch circuit,
   wherein the electric potential of the storage capacitor line is configured to be fixed by inputting a signal for having the second transistor in the ON state together with inputting the reset signal to the first transistor.

5. A liquid crystal display device comprising:
   a scanning line and a signal line that are disposed to intersect each other;
   a pixel that is disposed in correspondence with an intersection of the scanning line and the signal line and includes a liquid crystal and a pixel electrode, a common electrode, and a storage capacitor that apply a voltage to the liquid crystal;
   a storage capacitor line that is used for forming the storage capacitor;
   a display unit in which a plurality of the pixels is disposed; and
   a plurality of storage capacitor line driving circuits that is disposed to face each other with the display unit interposed therebetween and is used for driving the storage capacitor line,
   wherein the plurality of storage capacitor line driving circuits is disposed in one end and the other end of the storage capacitor line, and
   wherein the electric potential of the storage capacitor line is configured to be fixed to a designated electric potential based on a reset signal that is input to the plurality of storage capacitor line driving circuits.

6. The liquid crystal display device according to claim 5, wherein the display unit is configured in a large size of four inches or more.

* * * * *